US008693897B2

(12) United States Patent
Mo et al.

(10) Patent No.: US 8,693,897 B2
(45) Date of Patent: Apr. 8, 2014

(54) DIGITAL DEMODULATOR ARCHITECTURE

(75) Inventors: Fan Mo, Hinckley, OH (US); William Thesling, Hudson, OH (US); Matthew Nimon, Hinckley, OH (US); Sameep Dave, Hinckley, OH (US)

(73) Assignee: ViaSat, Inc., Carlsbad, CA (US)

( * ) Notice: Subject to any disclaimer, the term of this patent is extended or adjusted under 35 U.S.C. 154(b) by 21 days.

(21) Appl. No.: 13/205,431

(22) Filed: Aug. 8, 2011

(65) Prior Publication Data
US 2012/0189318 A1 Jul. 26, 2012

Related U.S. Application Data

(60) Provisional application No. 61/435,278, filed on Jan. 22, 2011.

(51) Int. Cl.
*H04B 10/06* (2011.01)
(52) U.S. Cl.
USPC ........... 398/208; 398/202; 398/209; 398/158; 398/159; 398/136
(58) Field of Classification Search
USPC ......... 398/202, 204, 205, 206, 207, 208, 209, 398/210, 211, 212, 213, 214, 183, 184, 188, 398/158, 159, 33, 34, 25, 26, 27, 147, 81, 398/65, 152, 203, 135, 136
See application file for complete search history.

(56) References Cited

U.S. PATENT DOCUMENTS

| 4,451,916 | A | 5/1984 | Casper et al. |
| 4,965,858 | A | 10/1990 | Naito et al. |
| 5,457,704 | A | 10/1995 | Hoeher et al. |
| 6,304,620 | B1 | 10/2001 | Rouphael |
| 6,323,787 | B1 | 11/2001 | Yamashita |
| 6,446,236 | B1 | 9/2002 | McEwen et al. |
| 6,614,950 | B2 | 9/2003 | Huang et al. |
| 6,687,315 | B2 | 2/2004 | Keevill et al. |
| 7,106,784 | B2 | 9/2006 | Eltawil et al. |
| 7,251,256 | B1 | 7/2007 | Barry et al. |
| 7,266,310 | B1 | 9/2007 | Savory et al. |
| 7,522,841 | B2 | 4/2009 | Bontu et al. |

(Continued)

FOREIGN PATENT DOCUMENTS

EP 2352239 A1 8/2011

OTHER PUBLICATIONS

International Search Report and Written Opinion dated Aug. 30, 2012, PCT/US2012/022231 to ViaSat, Inc. et al., 8 pgs.

(Continued)

*Primary Examiner* — Hanh Phan
(74) *Attorney, Agent, or Firm* — Holland & Hart LLP

(57) ABSTRACT

Methods, systems, and devices are described for a digital demodulator device for processing received optical signals. The device may include a quadrature error filter that receives a digitized version of an optical signal, and removes quadrature errors to generate a filtered series of data samples. The device may also include a frequency offset removal module for performing frequency rotation on the filtered series of data samples. The device may include a chromatic dispersion compensation module which removes chromatic dispersion from horizontal and vertical polarization channels. The device may include a polarization mode dispersion (PMD)/polarization dependent loss (PDL) compensation module which compensates for interference caused by PMD and PDL. The device may also include a phase recovery module configured to track and correct phase.

26 Claims, 10 Drawing Sheets

(56) References Cited

U.S. PATENT DOCUMENTS

| | | |
|---|---|---|
| 7,636,525 B1 | 12/2009 | Bontu et al. |
| 7,856,068 B1 | 12/2010 | Tung et al. |
| 7,899,340 B1 | 3/2011 | Bontu et al. |
| 8,078,066 B2 | 12/2011 | Li et al. |
| 8,095,019 B2 | 1/2012 | Kaneda et al. |
| 8,103,177 B2 | 1/2012 | Zhang et al. |
| 8,121,220 B1 | 2/2012 | Shi et al. |
| 8,249,208 B2 | 8/2012 | Dubouloz et al. |
| 8,249,463 B2 | 8/2012 | Perkins |
| 8,270,544 B2 | 9/2012 | Li |
| 8,300,758 B2 | 10/2012 | Feller |
| 8,301,039 B2 | 10/2012 | Nishihara et al. |
| 8,355,637 B2 | 1/2013 | Sano et al. |
| 8,374,291 B1 | 2/2013 | Himsoon et al. |
| 8,374,512 B2 | 2/2013 | Tao et al. |
| 8,406,638 B2 | 3/2013 | Hoshida |
| 8,472,814 B2 | 6/2013 | Zhang et al. |
| 8,478,135 B2 | 7/2013 | Xie |
| 8,526,831 B2 | 9/2013 | Winzer |
| 8,571,423 B2 | 10/2013 | Winzer |
| 2004/0184487 A1 | 9/2004 | Kim |
| 2004/0223767 A1 | 11/2004 | Pappalardo et al. |
| 2006/0013590 A1 | 1/2006 | Hueda et al. |
| 2006/0067394 A1 | 3/2006 | Chen |
| 2006/0120475 A1 | 6/2006 | Zhidkov et al. |
| 2007/0036555 A1 | 2/2007 | Chen et al. |
| 2007/0065078 A1 | 3/2007 | Jiang |
| 2007/0071456 A1 | 3/2007 | Chen et al. |
| 2007/0206963 A1 | 9/2007 | Koc |
| 2007/0217484 A1 | 9/2007 | Leiby, III et al. |
| 2007/0217792 A1 | 9/2007 | Nonaka et al. |
| 2008/0152361 A1 | 6/2008 | Chen et al. |
| 2009/0213908 A1 | 8/2009 | Bottomley |
| 2009/0316754 A1 | 12/2009 | Leiby, III et al. |
| 2010/0209121 A1* | 8/2010 | Tanimura ............... 398/202 |
| 2010/0232809 A1* | 9/2010 | Cai et al. ............... 398/202 |
| 2010/0239264 A1 | 9/2010 | Yang et al. |
| 2010/0329677 A1* | 12/2010 | Kaneda et al. ............ 398/65 |
| 2011/0064421 A1* | 3/2011 | Zhang et al. ............ 398/208 |
| 2011/0179099 A1 | 7/2011 | Hu et al. |
| 2011/0255877 A1 | 10/2011 | Nakashima et al. |
| 2011/0255878 A1 | 10/2011 | Sage |
| 2012/0033965 A1* | 2/2012 | Zhang et al. ............ 398/38 |
| 2012/0106982 A1 | 5/2012 | Wagner et al. |
| 2012/0141144 A1 | 6/2012 | Cai et al. |
| 2012/0177365 A1 | 7/2012 | Winzer |
| 2013/0136450 A1 | 5/2013 | Roberts et al. |

OTHER PUBLICATIONS

International Search Report and Written Opinion dated Aug. 30, 2012, PCT/US2012/022234 to ViaSat, Inc. et al., 10 pgs.

Non-final Office Action dated Dec. 19, 2012, U.S. Appl. No. 13/205,441 to Zelensky et al., 9 pgs.

Non-final Office Action dated Feb. 13, 2013, U.S. Appl. No. 13/356,198 to Mo et al., 11 pgs.

International Preliminary Report on Patentability dated Aug. 1, 2013, Int'l App. No. PCT/US2012/022231 to ViaSat, Inc. et al., 5 pgs.

International Preliminary Report on Patentability dated Aug. 1, 2013, Int'l App. No. PCT/US2012/022234 to ViaSat, Inc. et al., 6 pgs.

Notice of Allowance dated Sep. 13, 2013, U.S. Appl. No. 13/356,159 to Nimon et al., 14 pgs.

Notice of Allowance dated Oct. 17, 2013, U.S. Appl. No. 13/356,177 to Nimon et al., 15 pgs.

Non-final Office Action dated Jun. 6, 2013, U.S. Appl. No. 13/205,435 to Mo et al., 12 pgs.

Non-final Office Action dated Jul. 17, 2013, U.S. Appl. No. 13/205,441 to Zelensky et al., 9 pgs.

Non-final Office Action dated Aug. 30, 2013, U.S. Appl. No. 13/356,192 to Mo et al., 19 pgs.

Notice of Allowance dated Jun. 12, 2013, U.S. Appl. No. 13/356,198 to Mo et al., 8 pgs.

Notice of Allowance dated Nov. 27, 2013, U.S. Appl. No. 13/205,435 to Mo et al., 13 pgs.

Non-final Office Action dated Nov. 22, 2013, U.S. Appl. No. 13/205,437 to Mo et al., 16 pgs.

Notice of Allowance dated Nov. 8, 2013, U.S. Appl. No. 13/205,441 to Zelensky et al., 9 pgs.

Notice of Allowance dated Dec. 6, 2013, U.S. Appl. No. 13/356,192 to Mo et al., 9 pgs.

* cited by examiner

US 8,693,897 B2

DIGITAL DEMODULATOR ARCHITECTURE

CROSS REFERENCES

The present application claims the benefit of U.S. Provisional Patent Application No. 61/435,278, filed on Jan. 22, 2011, entitled "HIGH RATE OPTICAL COMMUNICATION," which is incorporated herein by reference in its entirety.

BACKGROUND

The present disclosure relates to systems, devices, and methods for demodulation in fiber optic communications systems.

Fiber optic channels in network communications systems are widely deployed and are considered effective for data transmission, allowing relatively high bandwidth data communication. Optical fiber is typically flexible and can be bundled in cables. It is often used for long-distance communications because light propagates through the fiber with little attenuation compared to electrical cables. Typical present day commercial optical fiber systems transmit data at 10 or 40 Gbps. Each fiber can carry multiple independent channels, each using a different wavelength of light in a technique known as wavelength-division multiplexing (WDM).

Increased data transmission rates would be desirable as demand for bandwidth increases. However, in fiber optic systems, as data rates increase various optical phenomena begin to manifest and act to limit data transmission rates. For example, optical effects from chromatic dispersion (CD), polarization mode dispersion (PMD), and polarization dependent loss (PDL) begin to have a significant impact on the data transmission rate.

SUMMARY

Methods, systems, devices, and computer program products are described for a digital demodulator device for processing received optical signals. The device may include a quadrature error filter that receives a digitized version of an optical signal, and removes quadrature errors to generate a corrected series of data samples. The device may include a frequency offset removal module for performing frequency rotation on the corrected series of data samples. It may also include a chromatic dispersion compensation module which removes chromatic dispersion from horizontal and vertical polarization channels, and a polarization mode dispersion (PMD)/polarization dependent loss (PDL) compensation module which compensates for interference caused by PMD and PDL. A phase recovery module may be configured to track and correct phase.

In some embodiments, a symbol timing acquisition and tracking module may estimate symbol timing using an early/late symbol radius matching scheme and PI controller, and generate an error signal to correct symbol timing. A frame synchronization and interface module may process data to achieve frame synchronization. Other functionality may be implemented, as described in more detail below.

A digital demodulator device for received optical signals may include a quadrature error filter module configured to receive a digitized version of an optical signal, and remove quadrature errors to generate a corrected series of data samples; a frequency offset removal module configured to perform frequency rotation on the corrected series of data samples; a chromatic dispersion compensation module configured to remove chromatic dispersion from horizontal and vertical polarization channels; a polarization mode dispersion (PMD)/polarization dependent loss (PDL) compensation module configured to compensate for interference caused by PMD and PDL; and a phase recovery module configured to track and correct phase.

A system may include means for receiving a digitized version of an optical signal, removing quadrature errors to generate a corrected series of data samples, performing frequency rotation on the corrected series of data samples, removing chromatic dispersion from horizontal and vertical polarization channels of a processed version of the optical signal, compensating for interference caused by PMD and PDL, and tracking and correcting phase.

A method may include receiving a digitized version of an optical signal, removing quadrature errors to generate a corrected series of data samples, performing frequency rotation on the corrected series of data samples, removing chromatic dispersion from horizontal and vertical polarization channels, compensating for interference caused by PMD and PDL, and tracking and correcting phase.

BRIEF DESCRIPTION OF THE DRAWINGS

A further understanding of the nature and advantages of various embodiments of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Methods, systems, and devices are described for a digital demodulator device for processing received optical signals. A digitized version of an optical signal may be received, made up of four parallel streams: a horizontal in-phase stream, a vertical in-phase stream, a horizontal quadrature stream, and a vertical in-phase stream. The device may include a quadrature error filter that receives the digitized version of the optical signal, and removes quadrature errors to generate a corrected series of data samples. The device may also include a frequency offset removal module for performing frequency rotation on the corrected series of data samples. The design may also compensate for chromatic dispersion, polarization mode dispersion (PMD), and polarization dependent loss (PDL). A phase recovery module may be configured to track and correct phase. Additional functionality may be implemented, as described in more detail below.

This description provides examples, and is not intended to limit the scope, applicability or configuration of embodiments of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
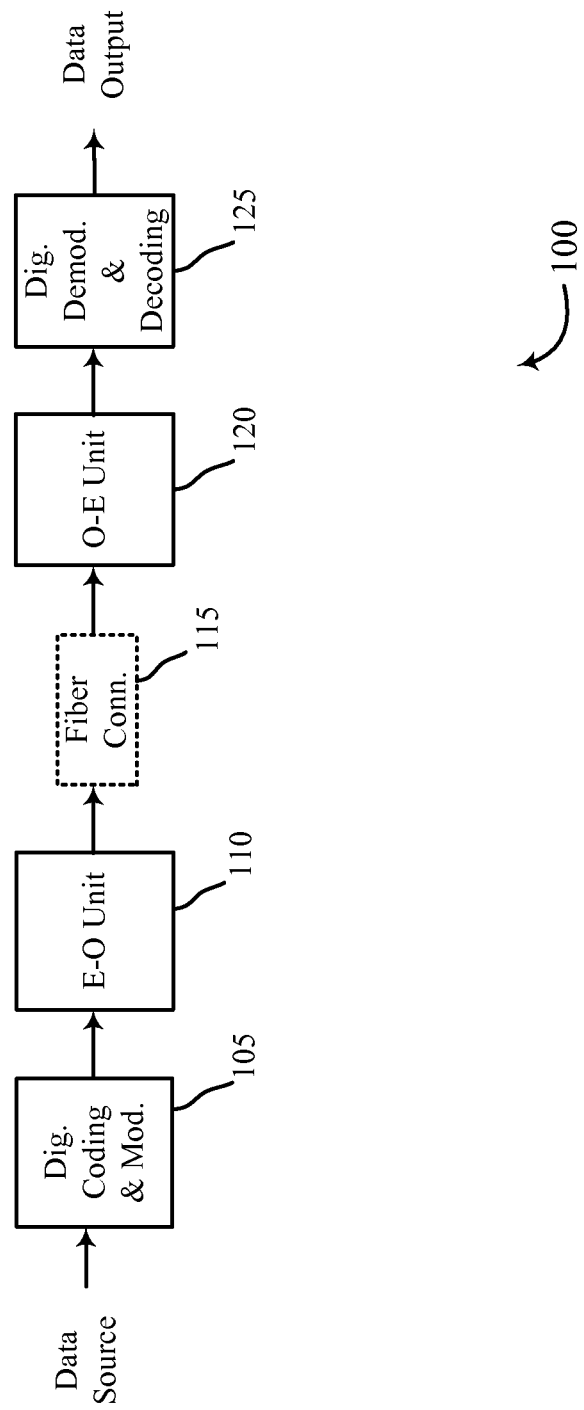
FIG. 1 is a block diagram of an optical communication system including components configured according to various embodiments of the invention.

Systems, devices, methods, and software are described for an optical communication system that utilizes fiber optic optical cables as a data transmission medium. An example of an optical data transport system 100 is illustrated in FIG. 1. In this embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. The digital coding and modulation unit 105 receives this data, and performs framing, forward error correction coding, and modulation functions on the data. The electrical-to-optical (E-O) unit 110 transforms the data into optical signals, and transmits optical signals containing the data via a fiber connection 115. The fiber connection 115 may include well known components of such connections, including a fiber optic cable. An optical-to-electrical (O-E) unit 120 receives the optical signal from the fiber connection 115, and transforms the data into the electrical domain. The digital demodulation and decoding unit 120 receives the digitized version of the optical signal and performs demodulation, forward error correction decoding, and de-framing functions on the data from the optical signal. The digital demodulation and decoding unit 120 may then output the data (e.g., to a user telecommunications device, a cable operator head-end unit, a telecommunications provider central office, a computer server, or a network attached storage system).

Figure 2:
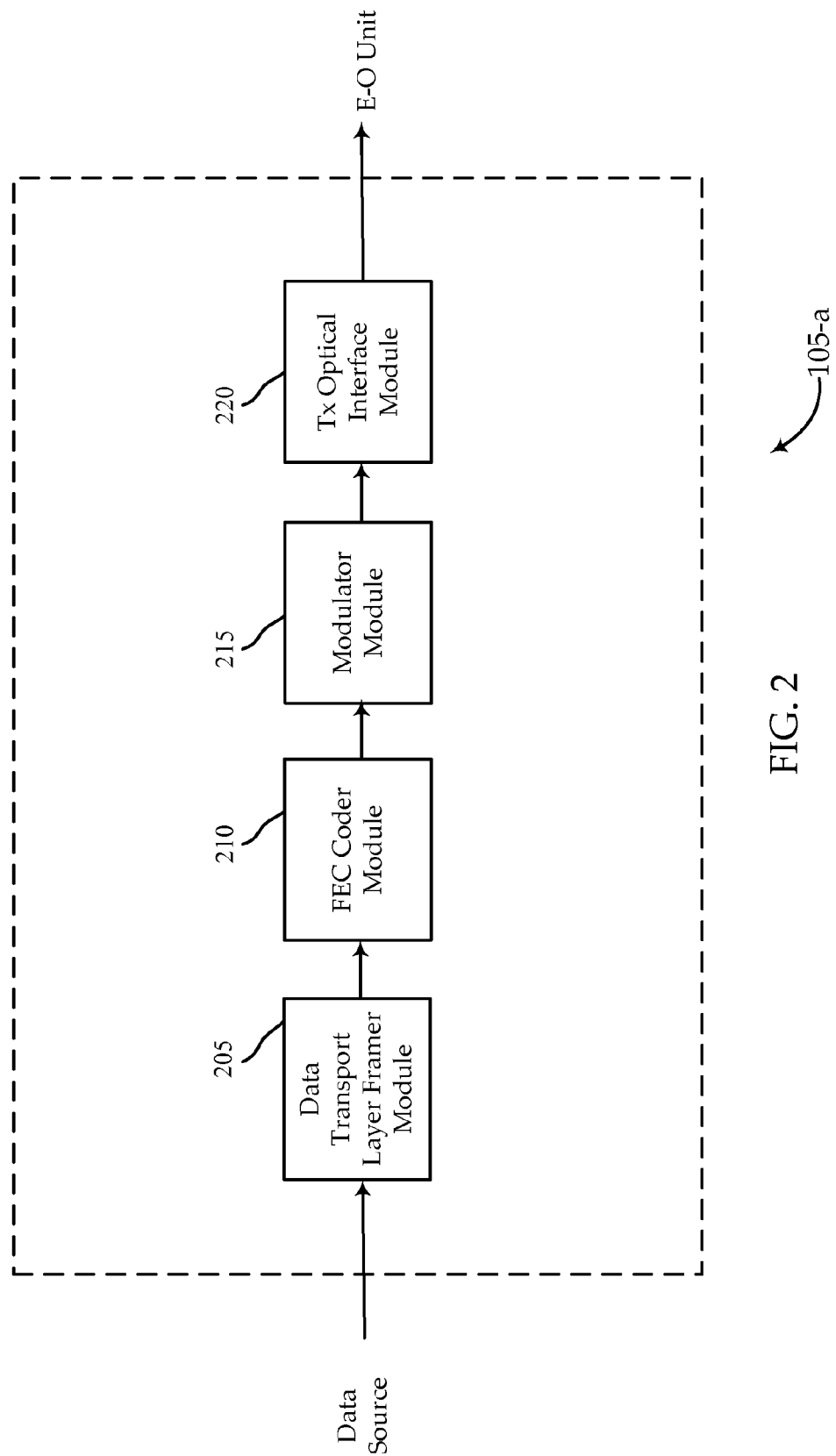
FIG. 2 is a block diagram of a digital coding and modulation unit according to various embodiments of the invention.

FIG. 2 illustrates a digital coding and modulation unit 105-a. In the illustrated embodiment, the digital coding and modulation unit 105-a includes a data transport layer framer module 205, an FEC coder module 210, a modulator module 215, and a transmitter optical interface module 220. The data transport layer framer module 205 may place the data received from the data source into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission. The FEC coder module 210 calculates and adds forward error correction (FEC) information to the frames of data received from the data transport layer framer module 205. The particular type of FEC information of various embodiments generally includes systematically generated redundant error-correcting code (ECC) data that is transmitted along with the frames. There may be differential encoding used in some embodiments. The modulator module 215 modulates the frames and FEC information, forwarding the data to a transmitter optical interface module 220. The transmitter optical interface module 220 may forward the modulated data to the E-O module where it may be transmitted in the optical domain via a dual-polarity (dual-pole) quadrature phase-shift-keying (QPSK) modulation, resulting in four parallel optical streams. Other modulation schemes may be used in other examples, as well.

Figure 3:
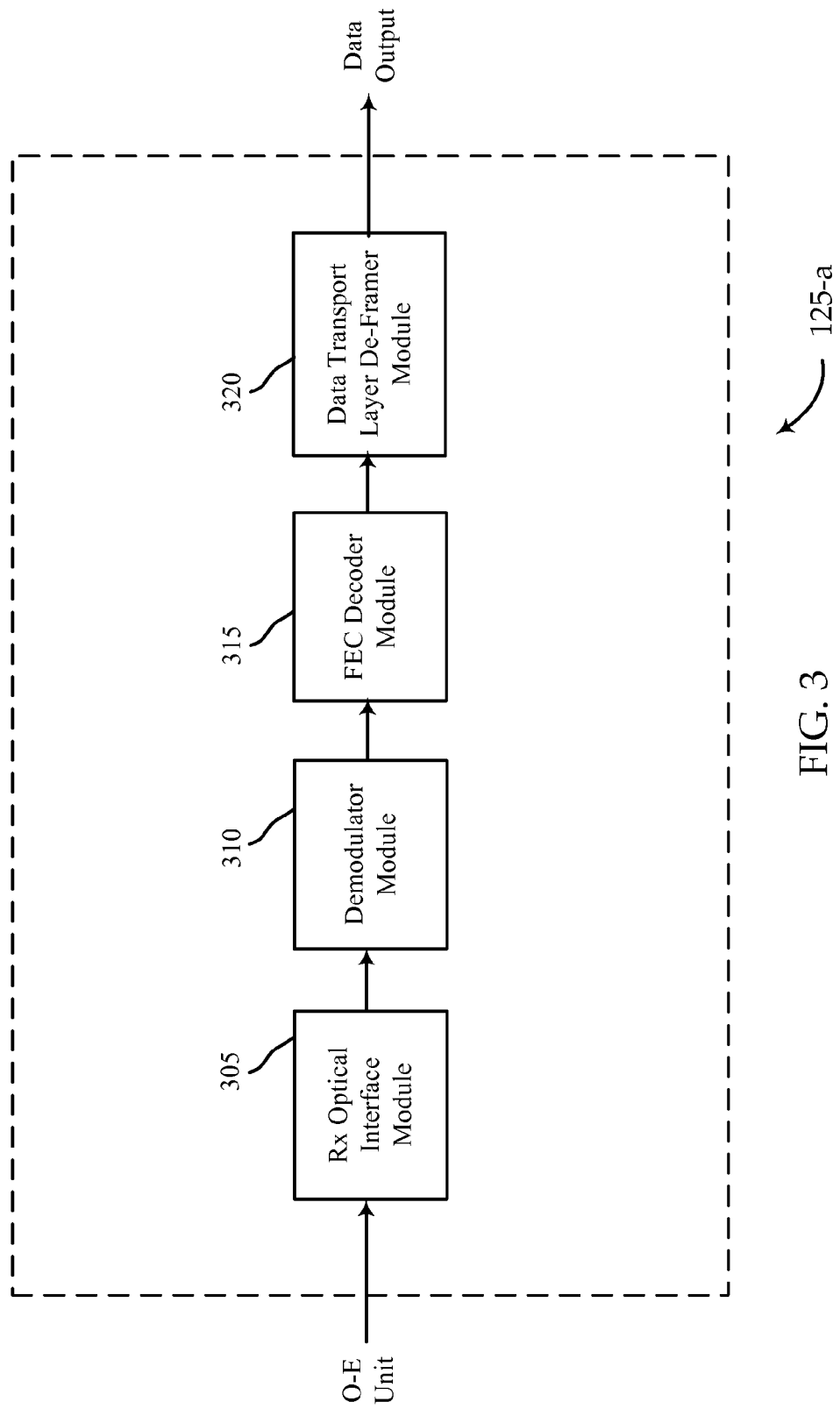
FIG. 3 is a block diagram of a digital demodulation and decoding unit according to various embodiments of the invention.

As illustrated in FIG. 3, a digital demodulation and decoding unit 125-a may include a number of modules, as well. In this embodiment the digital demodulation and decoding unit 125-a includes a receiver optical interface module 305, a demodulator module 310, an FEC decoder module 315, and a data transport layer de-framer module 320. The receiver optical interface 305 is the interface from the O-E unit 120. The receiver optical interface module 305 provides electrical signals to a demodulator module 310. Various embodiments of the demodulator module 310 will be discussed in further detail below. The information from the demodulator module 310 is provided to FEC decoder module 315 which decodes and may correct transmission errors identified from error-correcting code. The FEC decoder module 315 provides decoded data to the data transport layer de-framer module 320, which de-frames the data from the signal according to the particular protocol used in the optical transmission, and provides output data. The data output may be, for example, a user or any receiving system.

These components of may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

Figure 4:
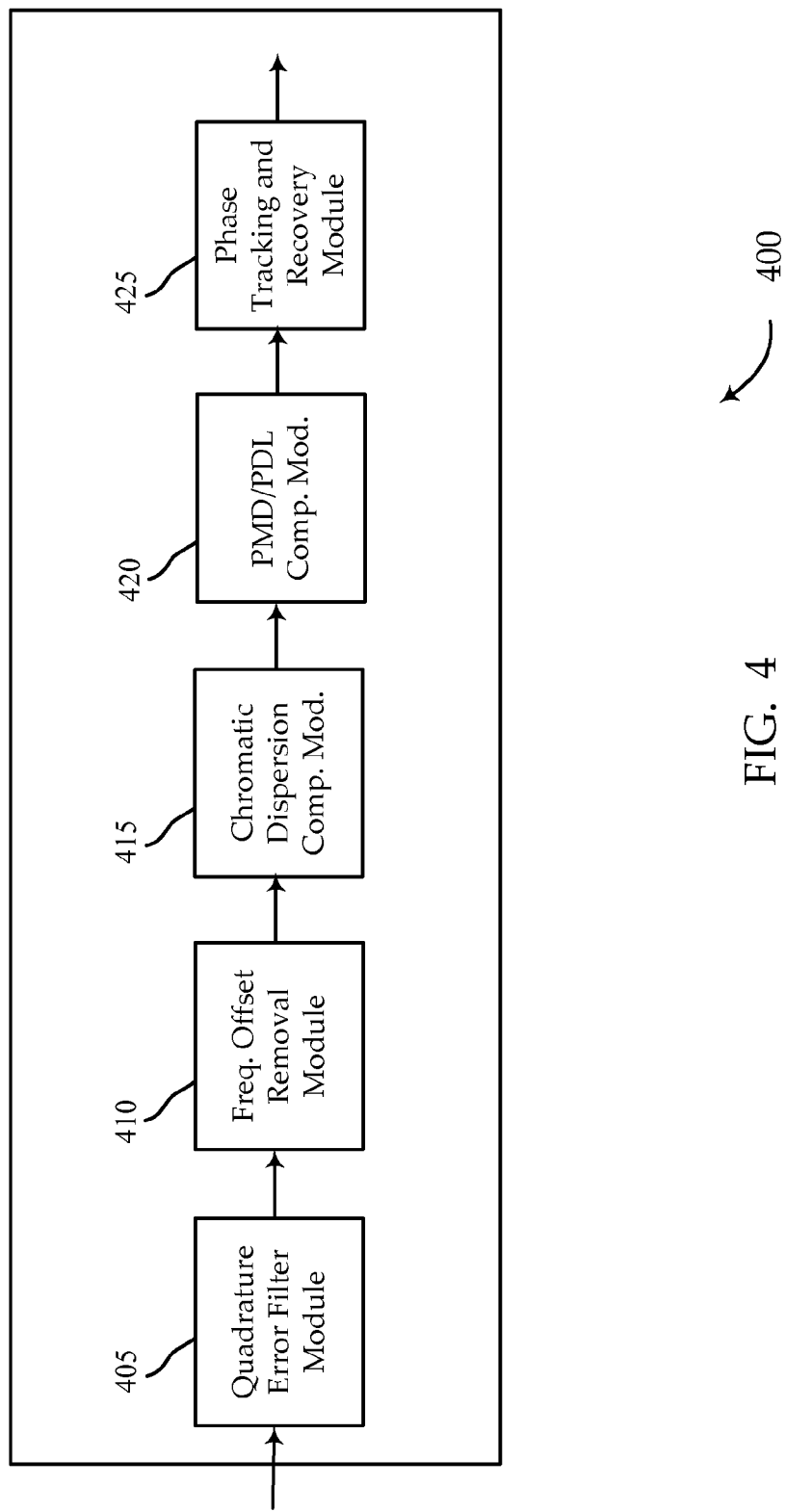
FIG. 4 is a block diagram of a demodulation unit according to various embodiments of the invention.

Turning now to FIG. 4, an example of a digital demodulator 400 is shown. This may be an example of the demodulator module 310 illustrated in FIG. 3. The digital demodulator 400 includes a quadrature error filter module 405, a frequency offset removal module 410, a chromatic dispersion compensation module 415, a PMD/PDL compensation module 420, and a phase tracking and recovery module 425.

A digitized version of an optical signal may be received. It may be made up of four parallel streams: a horizontal in-phase stream, a vertical in-phase stream, a horizontal quadrature stream, and a vertical quadrature stream (e.g., from the receiver optical interface module). The quadrature error filter module 405 receives a digitized version of an optical signal, and removes quadrature errors to generate a corrected series of data samples. There may be a frequency offset removal module 410 for performing frequency rotation on the corrected series of data samples. The chromatic dispersion compensation module 415 removes chromatic dispersion from horizontal and vertical polarization channels. A PMD/PDL compensation module 420 may compensate for interference caused by PMD and PDL. The device may also include a phase tracking and recovery module 425 configured to track and correct phase.

In some examples, the quadrature error filter module 405 is configured to remove quadrature errors by detecting and removing in-phase and quadrature skew, direct current bias, in-phase and quadrature amplitude imbalance, or in-phase and quadrature phase imbalance. The quadrature error filter module 405 may remove such quadrature errors from a portion of the optical signal before the portion is received by the frequency offset removal module 410. There may also be a carrier frequency acquisition and tracking module (not shown) after the PMD/PDL compensation module 420, and before the phase tracking and recovery module 425 in the receive chain. The carrier frequency acquisition and tracking module may be configured to calculate a frequency error metric for transmission to the frequency offset removal module 410. The carrier frequency acquisition and tracking module may calculate a filtered frequency error metric for transmission off the device to a local oscillator.

Figure 5:
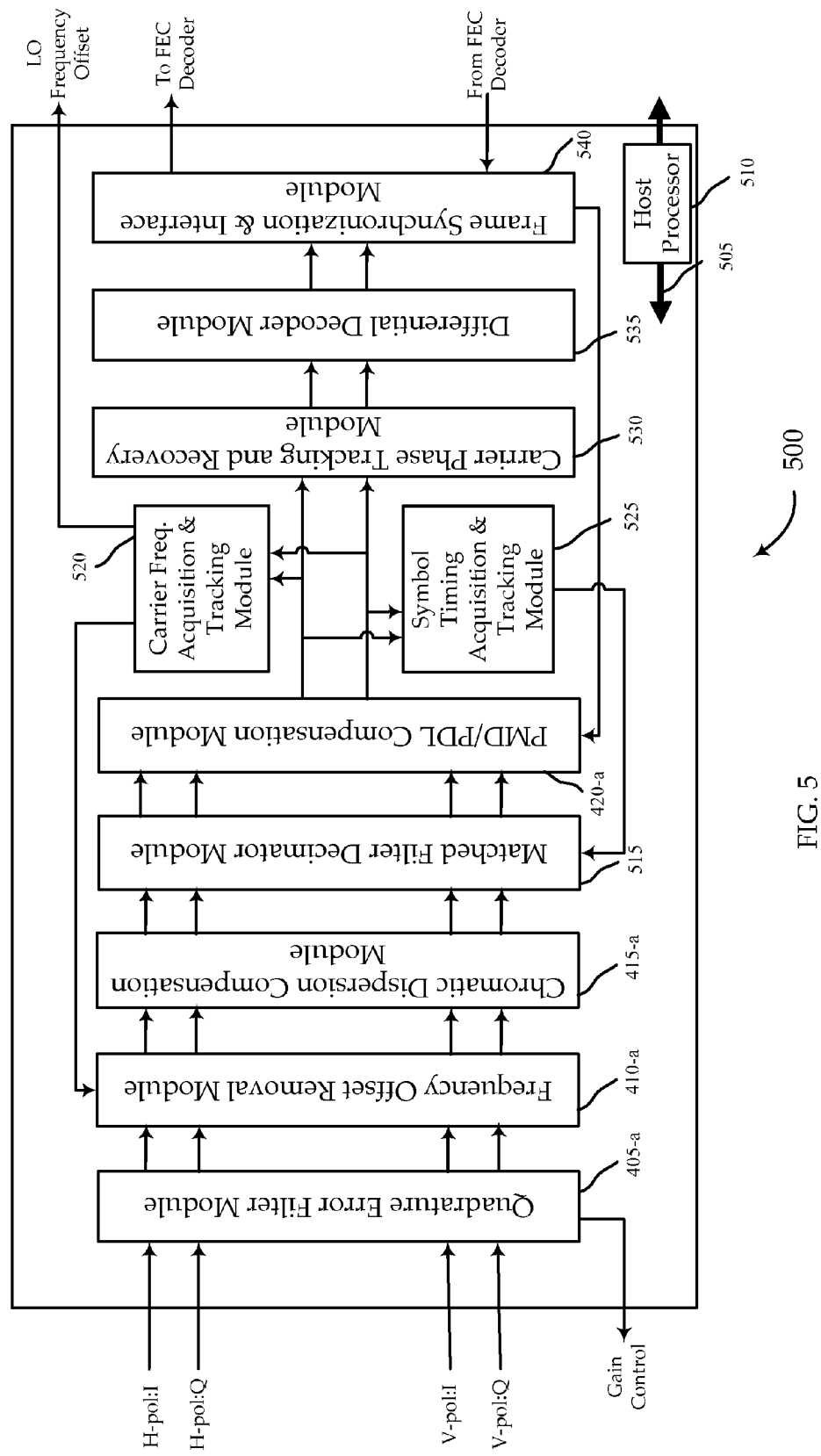
FIG. 5 is a block diagram of a digital demodulation unit according to various embodiments of the invention.

Referring now to FIG. 5, a demodulator unit 500 is described. This may be the digital demodulator unit 400 of FIG. 4, or the demodulator unit 310 of FIG. 3. In this example, two polarization components are received, one horizontal component (H) and one vertical component (V). Each of the H and V components includes both an in-phase (I) component and a quadrature (Q) component. For reference, the two components in the horizontal polarization are referred to as HI (horizontal in-phase component) and HQ (horizontal quadrature component). Similarly, the two components in the vertical polarization are referred to as VI (vertical in-phase component) and VQ (vertical quadrature component). The demodulator unit 500 processes the digitized samples of the I and Q components of the two polarization components to recover the transmitted data. At the input, the demodulator unit 500 accepts the four parallel streams carrying HI, HQ, VI and VQ samples. In one embodiment, each stream contains multiple samples per clock. At its output the demodulator may provide demodulated hard-decision data (although in other examples, soft-decision data may be provided) to the FEC decoder module (e.g., FEC decoder module 315 of FIG. 3). The demodulator unit 500 may identify the beginning of a FEC frame. Additionally, in some embodiments the demodulator unit 500 receives feedback signals from the FEC decoder module 315 regarding the convergence status for error correction.

In some embodiments, the demodulator unit 500 is implemented as an application specific integrated circuit (ASIC) that includes a number of functional modules. In such embodiments, the demodulator unit 500 may have a control and monitor interface bus 505 connected to a host processor 510 allowing for configuration of demodulator parameters (filter coefficients, loop gains, etc.) and extraction of demodulator status. With continuing reference to FIG. 5, several of the sub-modules within the demodulator unit 500 of various embodiments are described. In this embodiment, a quadrature error filter (QEF) module 405-$a$ provides a collection of data formatting, error detection and correction functions. In one embodiment, input data samples are expected to be in binary-offset/offset-binary format and are converted to a two's complement (2C) format for processing within a digital signal processor. The incoming HI, HQ, VI and VQ streams, in some embodiments, also can be independently swapped and inverted if needed, allowing for any design issues that might translate into an accidental inversion or IQ swap. Each data stream of these various embodiments may be processed to remove polarization skew (between H and V poles) as well as I-Q skew within a pole. The QEF module 405-$a$ may provide for detection and removal of four types of quadrature signal errors: I/Q Skew, DC bias, I/Q amplitude imbalance, and I/Q phase imbalance. All four error detectors may be independently enabled or disabled, in some embodiments, via the processor interface, and the detected error values are output as status values via this same interface. The QEF module 405-$a$ may also output a gain control signal that may be used by other components of the system.

The QEF module 405-$a$ is connected with a frequency offset removal module 410-$a$. The frequency offset removal module 410-$a$ in one example performs a frequency rotation on the data samples coming out of the QEF module 405-$a$. The amount of frequency rotation is controlled by a frequency error input that is sourced by a carrier frequency acquisition and tracking (CFAT) module 520. Such frequency offset removal function may remove residual frequency left from the LO laser tuning in the optical domain. A chromatic dispersion compensation module 415-$a$ removes bulk chromatic dispersion from the horizontal and vertical polarization channels. The compensation may be applied via a filter in the frequency domain. The amount of correction may be controlled by the chromatic dispersion filter inputs that are derived outside of the demodulator module 500 and provided via the host processor 510 and control and monitor interface bus 505, in this embodiment.

A matched filter decimator (MFD) module 515 may implement an interpolation function that provides decimation on samples taken at two+$\epsilon$ (two plus an arbitrarily small positive quantity) times the symbol rate. In one embodiment, each of the four data streams has an independent bank of FIR filters with selected coefficients. The incoming data is processed through the filter banks to produce two samples per symbol for each data stream. Data samples are gathered and assembled into blocks of fixed numbers of samples per stream per clock by a sample block assembler. The assembly function may be identical for the I and Q streams in each polarization so one assembly block may service two streams. A PMD/PDL compensation module 420-$a$ may utilize adaptive equalization to compensate for cross-polarization interference, IQ channel interference, and adjacent symbol interference introduced by PMD and PDL in the optical channel and other residual impairments, such as residual chromatic dispersion as mentioned above. In one embodiment, an adaptive equalizer takes in data at one or two samples/symbols from the MFD module 515 and processes the data through a bank of FIR filters with adaptive filter tap coefficients.

In some embodiments, a symbol timing acquisition and tracking (STAT) module 525 may estimate symbol timing using an early/late symbol radius matching scheme and PI controller, and generate an error signal to correct symbol timing. This STAT module 525, in an embodiment, also has a symbol timing lock detection mechanism that outputs a symbol lock indicator. In various embodiments, there are two sets of gains for the PI controller (wide band for acquisition and narrow band for tracking) When not in timing lock, the wideband gains may be used, otherwise, the narrowband gains may be used. The STAT module 525 may perform symbol timing acquisition and tracking of a portion of the optical signal after the PMD/PDL compensation module compensates for interference caused by PMD and PDL and before carrier phase recovery on the portion of the optical signal.

The CFAT module 520 may be responsible for acquiring, as well as tracking, carrier frequency. Carrier frequency acquisition is achieved using one of a number of techniques, such as through fast Fourier transform (FFT) with appropriate averaging and peak frequency component detection. The CFAT module 520 may provide a frequency error input to the frequency offset removal module 410-a. The CFAT module 520, in some embodiments, also provides a control output for the local oscillator (LO) frequency offset output, that may be used with data from the frame synchronization and interface module 540. A carrier phase tracking and recovery module 530 may use a feed-forward algorithm with a block phase estimator and a phase rotation function to remove residual frequency and phase errors. The carrier phase tracking and recovery module 530 may operate on the on-time data samples produced by the PMD compensation module. A differential decoder 535 may be responsible, in various embodiments, for accepting symbol streams from the carrier phase tracking and recovery module 530 (e.g., at 1 sample per symbol). The differential decoder 535 may be configured to differentially decode the signal and provide the decoded output (e.g., a hard-decision output data stream) to the frame synchronization and interface module 540. The frame synchronization and interface module 540 processes data to achieve frame synchronization, and may include functional blocks for data alignment, frame sync detection, and clock transfer. The frame synchronization module may be configured to skew, swap, and rotate received channels with respect to each other.

Figure 6:
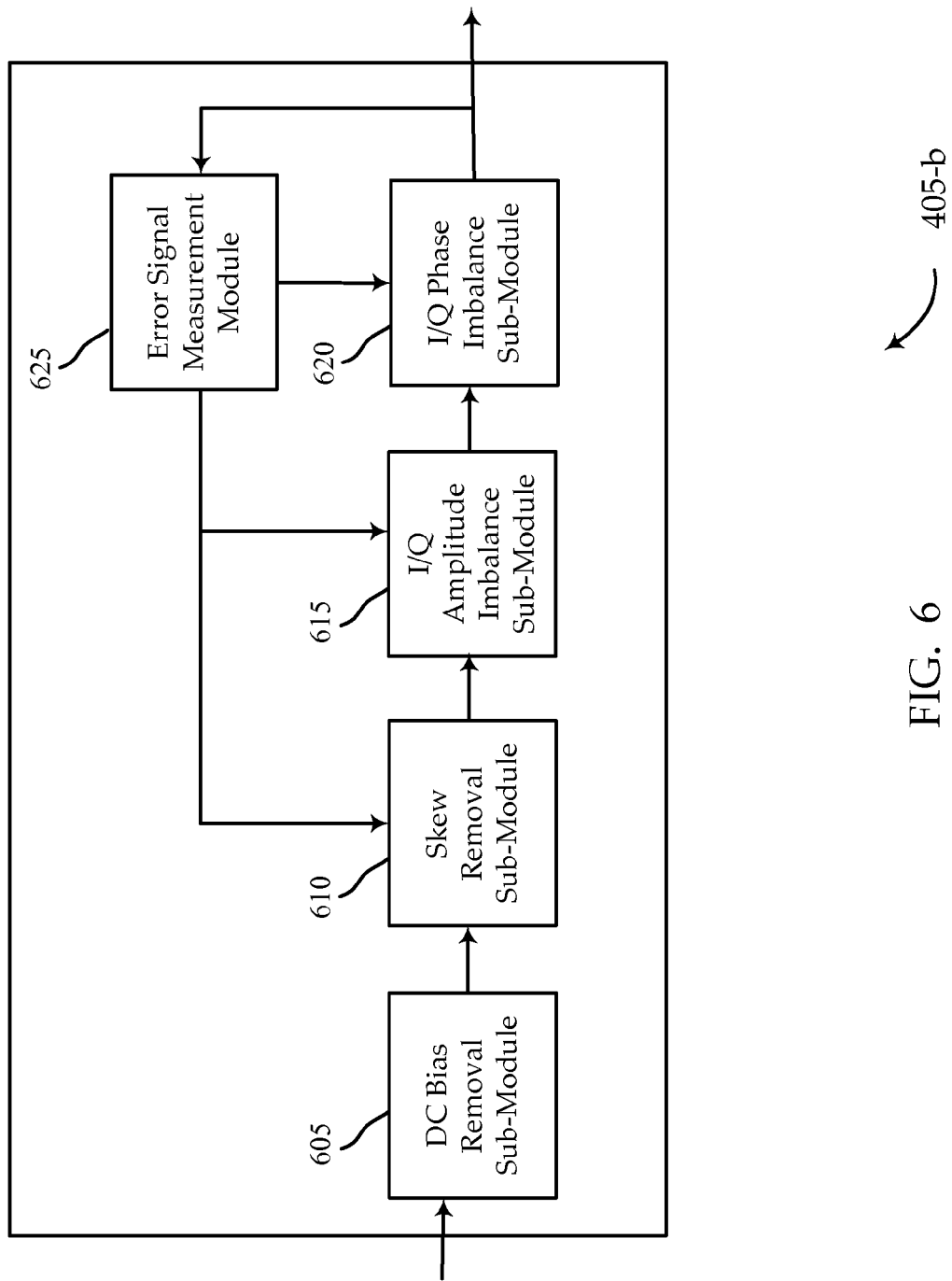
FIG. 6 is a block diagram of a quadrature error filter according to various embodiments of the invention.

FIG. 6 illustrates an example of the quadrature error filter (QEF) module 405-b. This may be the QEF module 405 of FIG. 4 or 5. The QEF module 405-b may include a DC bias removal sub-module 605, skew removal sub-module 610, I/Q amplitude imbalance sub-module 615, I/Q phase imbalance sub-module 620, and error signal measurement module 625.

The QEF module 405-b may receive four parallel streams: a horizontal in-phase stream (HI), a vertical in-phase stream (VI), a horizontal quadrature stream (HQ), and a vertical quadrature stream (VQ). Samples may be in binary-offset/offset-binary format coming in from an ADC, and may be converted to the 2's complement (2C) format for the processing inside the DSP.

DC bias removal sub-module 605 may detect and remove DC bias for each stream. The DC bias may be detected via a very narrow band, first order IIR low-pass filter. The IIR loop gain may be programmable from $2^{-11}$ to $2^{-26}$. The filter output value may be subtracted from the raw data samples to remove any DC bias. The DC bias values for each stream may be provided as status outputs.

The skew removal sub-module 610 may process each stream to remove polarization skew (between H and V poles), as well as I-Q skew within a pole. For polarization skew removal a delay element may be used that can delay the poles with respect to each other by a programmable number of integer sample durations. This may allow coarse polarization skew removal at calibration time. Any residual sub-sample duration polarization skew at calibration time or any slow time variation in the polarization skew may later be tracked out by the PMD equalizer (e.g., PMD/PDL compensation module 420 of FIG. 4 or 5). The integer sample delay may be available independently on the I and Q streams within a polarization to help coarse I/Q skew removal.

For coarse I/Q skew adjustments at calibration time, the shift control mentioned during polarization skew removal may be used. An interpolating delay filter may be used to fine tune sub-sample time delays between I-Q streams. At calibration time, as well as on cold start, a trial and error approach may be used to identify the skew adjustment setting that provides the lowest error signal generated within the QEF block. For tracking slow variations in this skew over time the error signal corresponding to the current skew setting (as well as skew settings one higher and one lower than the current setting) may be monitored, and a DSP may switch the current skew setting if the error signal for the other settings becomes smaller than the current setting.

The I/Q amplitude imbalance sub-module 615 may measure the average power difference between the I and Q sample channels of each polarization (H and V). The power difference between I and Q may be multiplied by a very small gain term (e.g., programmable from $2^{-11}$ to $2^{-26}$) and that multiplied error may be input to an accumulator. The output of the accumulator may be applied as a gain to all samples in the Q channel, to thereby remove the gain. This imbalance removal brings the channel to the same average power (or amplitude) level as the reference channel.

The I/Q phase imbalance sub-module 620 may measure the average cross correlation between the I and Q sample channels of each polarization (H and V). The cross correlation value for each polarization may be multiplied by a very small gain term (programmable from $2^{-11}$ to $2^{-26}$) and input to an accumulator. The output of the accumulator represents the amount of I channel 'bleeding' into the Q channel in that polarization. This value may be applied as a gain to all the I samples in the given polarization to remove the phase imbalance. The result of the multiply may be subtracted from the corresponding Q samples to remove the cross correlation. The output of the I/Q phase imbalance sub-module 620 may be forwarded to the frequency offset removal module 410 of FIG. 4 or 5.

The output of the I/Q phase imbalance sub-module 620 may be fed into the error signal measurement module 625 for error measurement. The error may be fed back into the skew removal sub-module 610, I/Q amplitude imbalance sub-module 615, and I/Q phase imbalance sub-module 620 for use in their processing.

Figure 7:
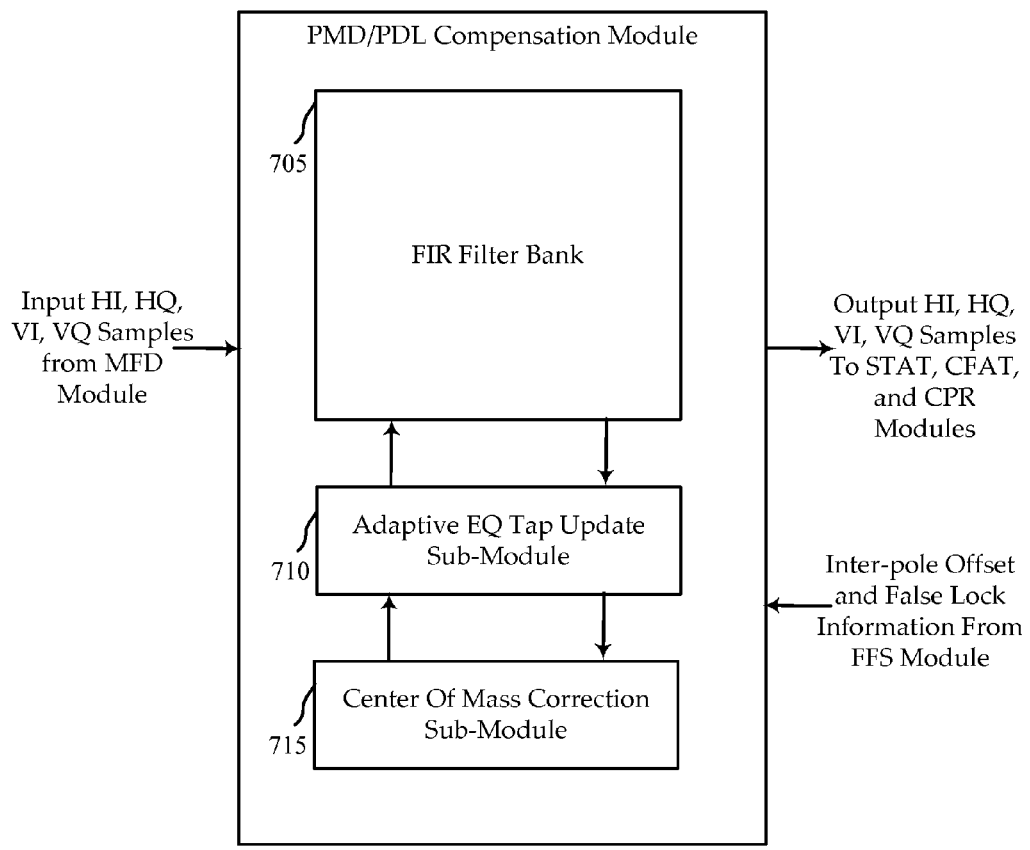
FIG. 7 is a block diagram of a PMD/PDL compensation unit according to various embodiments of the invention.

Turning next to FIG. 7, a block diagram illustrates an example configuration of a PMD/PDL compensation module 420-b. This may be the PMD/PDL compensation module 420 of FIG. 4 or 5. It may include a FIR filter bank sub-module 705, an adaptive EQ tap update sub-module 710, and a center of mass correction sub-module 715. The PMD/PDL compensation module 420-b may be configured to detect and remove cross polarization interference, IQ channel interference, and adjacent symbol interference introduced by PMD and PDL in the optical channel.

In the illustrated example, the PMD/PDL compensation module 420-b is an adaptive equalizer that takes in data at 2 samples/symbol (e.g., from the matched filter decimator (MFD) module 515 of FIG. 5) and processes the data through a FIR filter bank sub-module 705 with adaptive filter tap coefficients. The PMD/PDL compensation module 420-b may receive four parallel streams: a horizontal in-phase stream (HI), a vertical in-phase stream (VI), a horizontal quadrature stream (HQ), and a vertical quadrature stream (VQ). In one example, the FIR filter bank sub-module 705 is a FIR filter bank made up of four, 16-tap complex filters operating at 2 taps per symbol. These filter taps may be initialized as all-pass filters with a center tap weight of 1.0, and all other taps set to 0.0. The taps are updated by the adaptive EQ tap update algorithm when enabled.

In one example, the adaptive equalizer tap update algorithm is a Constant Modulus Algorithm (CMA). This algorithm drives the constellation points on each polarization (at optimal symbol timing) to a circle with the desired radius with minimum radius variation. The adaptive equalizer will converge, with high probability, to a solution that properly decouples the two polarizations. There are however corner cases where the EQ will converge to output the same polarization on both polarization outputs. This error event is detected downstream. When the error is detected, the filter taps for the vertical pole output may be reset.

FIR filter bank sub-module 705 may provide a partial output, with adaptive EQ tap update sub-module 710 receiving the partial outputs, providing further compensation as needed, and outputting the final PMD/PDL compensated output. The center of mass correction sub-module 715 is configured to add or remove symbols to/from the output to compensate, as needed, for corresponding shifts in the filter taps. The filtered output may be sent from the PMD/PDL compensation module 420-b to the CFAT module 520, STAT module 525, and/or carrier phase tracking and recovery module 530 of FIG. 5.

Figure 8:
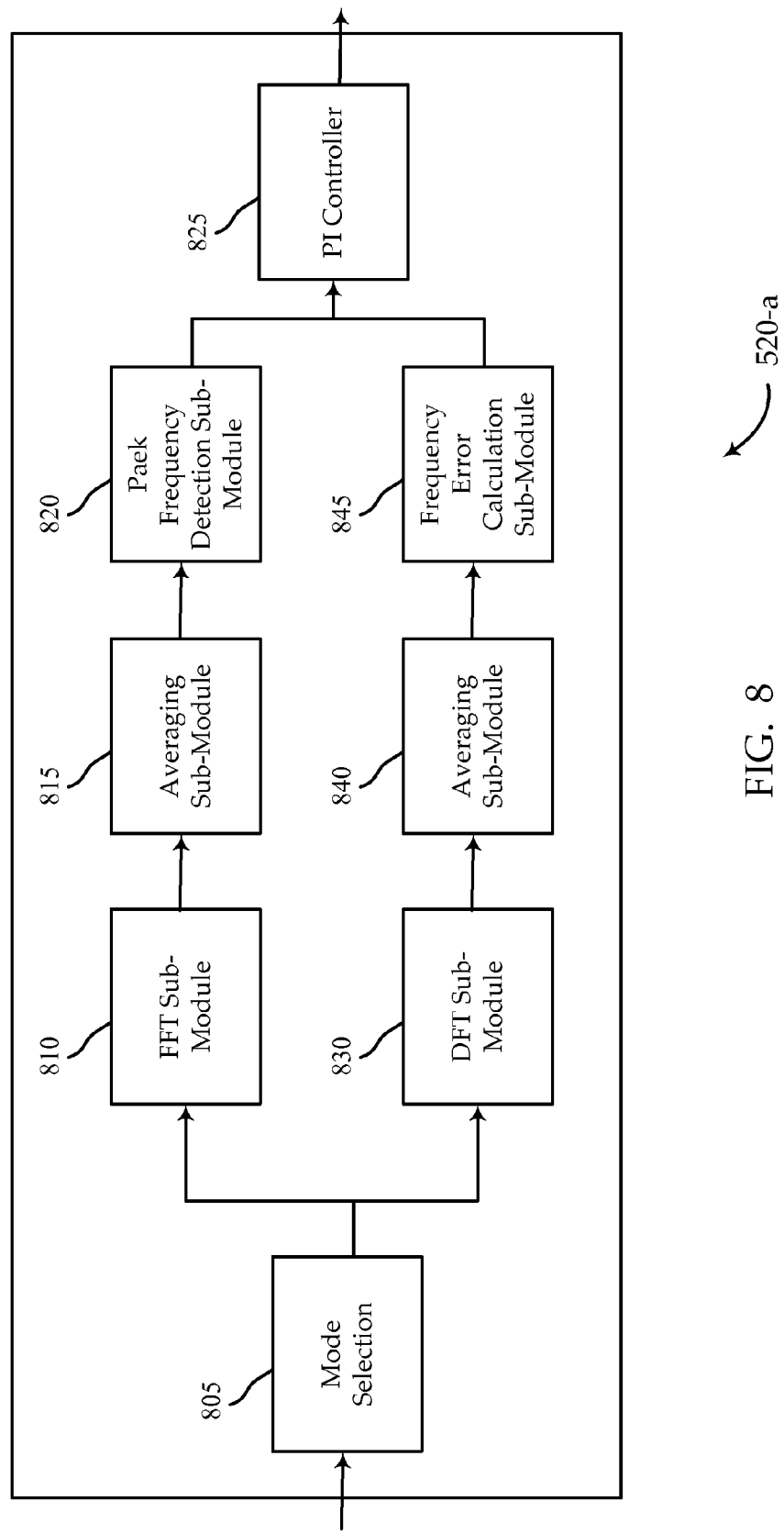
FIG. 8 is a block diagram of a frequency acquisition and tracking module according to various embodiments of the invention.

Turning next to FIG. 8, a block diagram illustrates an example configuration of a carrier phase acquisition and tracking (CFAT) module 520-a. This may be the CFAT module 520 of FIG. 5. CFAT module 520-a may include a mode selection sub-module 805, FFT sub-module 810, averaging sub-module 815, peak frequency detection sub-module 820, PI controller sub-module 825, DFT sub-module 830, averaging sub-module 840, and frequency error calculation sub-module 845.

A CFAT module is responsible for acquiring as well as tracking carrier frequency. Carrier frequency acquisition may be achieved with a 256-point FFT with appropriate averaging and peak frequency component detection. Carrier frequency tracking may be achieved with a 2-point DFT with appropriate averaging and variable tracking bandwidth. The frequency error may be processed through a PI controller to produce a filtered frequency error. CFAT module may also use a carrier frequency lock detection mechanism. When not in frequency lock, the wider DFT bandwidth may be used, otherwise, the narrower DFT bandwidth may be used. The frequency lock signal may also used to decide if the frame synchronization and interface module 540 of FIG. 5 shall forward data to the decoder.

The CFAT module 520-a shown in FIG. 8 may be configured to operate on the on-time I/Q data samples from both polarizations. The CFAT module 520-a does not operate on all data samples, rather on blocks of 256 contiguous symbols once every 64 clocks to allow processing time between blocks. The incoming data may be processed through a 4θ conversion block to collapse the QPSK modulation down to a tone. The data out of the 4θ conversion block is processed through one of two paths depending on the mode of operation, as determined by mode selection sub-module 805. At startup, the CFAT module 520-a will be in acquisition mode until the bulk frequency offset measurement is within the tracking bandwidth of the frequency tracking loop. Once that process is complete, the module will operate in tracking mode.

In acquisition mode, the 4θ I/Q data for each polarization may be processed through a 256-point complex FFT, implemented in FFT sub-module 810. The FFT results may be output to averaging sub-module 815, for a block averaging function that block averages the complex FFT bin results over 8 sets of FFTs. The averaged FFT results may be output to a peak frequency detection sub-module 820 that converts the complex FFT results to a magnitude response, and searches for a valid peak frequency component within the response. Once a valid peak is detected the frequency error is calculated by the peak frequency detection sub-module 820. The frequency error may used to update a PI controller sub-module 825. In acquisition mode, the output of PI controller sub-module 825 is the bulk frequency offset, and is output for tuning the LO laser. A control state machine may monitor the frequency error input to the PI controller sub-module 825. As long as the frequency error is nonzero (or above a near zero threshold), the DFT section of the module (lower half of the FIG. 8) may be held in an idle state.

When the frequency error detected by the FFT is zero (the peak of the FFT is at the 0 component), the mode selection sub-module 805 may control the CFAT module 520-a to enter tracking mode. The DFT data processing and associated PI controller may be enabled and the FFT logic disabled. In tracking mode, the 4θ I/Q data for each polarization is processed through DFT sub-module 830, using a 2-point complex DFT. The DFT sub-module 830 may compute frequency bins at ±Δf frequency locations. The value of Δf is dependent on the state of the frequency lock signal. The DFT results are output to averaging sub-module 840 that block averages the two complex DFT bin results over multiple symbols worth of data per polarization.

The averaged DFT results are input to a pair of frequency error calculation blocks that convert the averaged complex DFT results to a pair of magnitudes per polarization. An error value is calculated as the difference in the positive and negative magnitude values per polarization. The frequency error calculation sub-module 845 receives the frequency error values from the two polarizations, and multiplies them by a weighting factor ($\beta$), and sums them to produce an average frequency error for the combined dual-polarization signal. The nominal value for $\beta$ is 0.50 but it can be programmed in the range {0.0, 1.0}. The composite frequency error value may used by PI controller sub-module 825 once per data block. The PI controller sub-module 825 tracking mode output may be the frequency error fed back to the frequency offset removal module 410 of FIG. 4 or 5 to shift the incoming data to baseband. The PI controller sub-module 825 tracking mode output may also be used to provide continuous frequency error updates for the LO laser in tracking mode.

Figure 9:
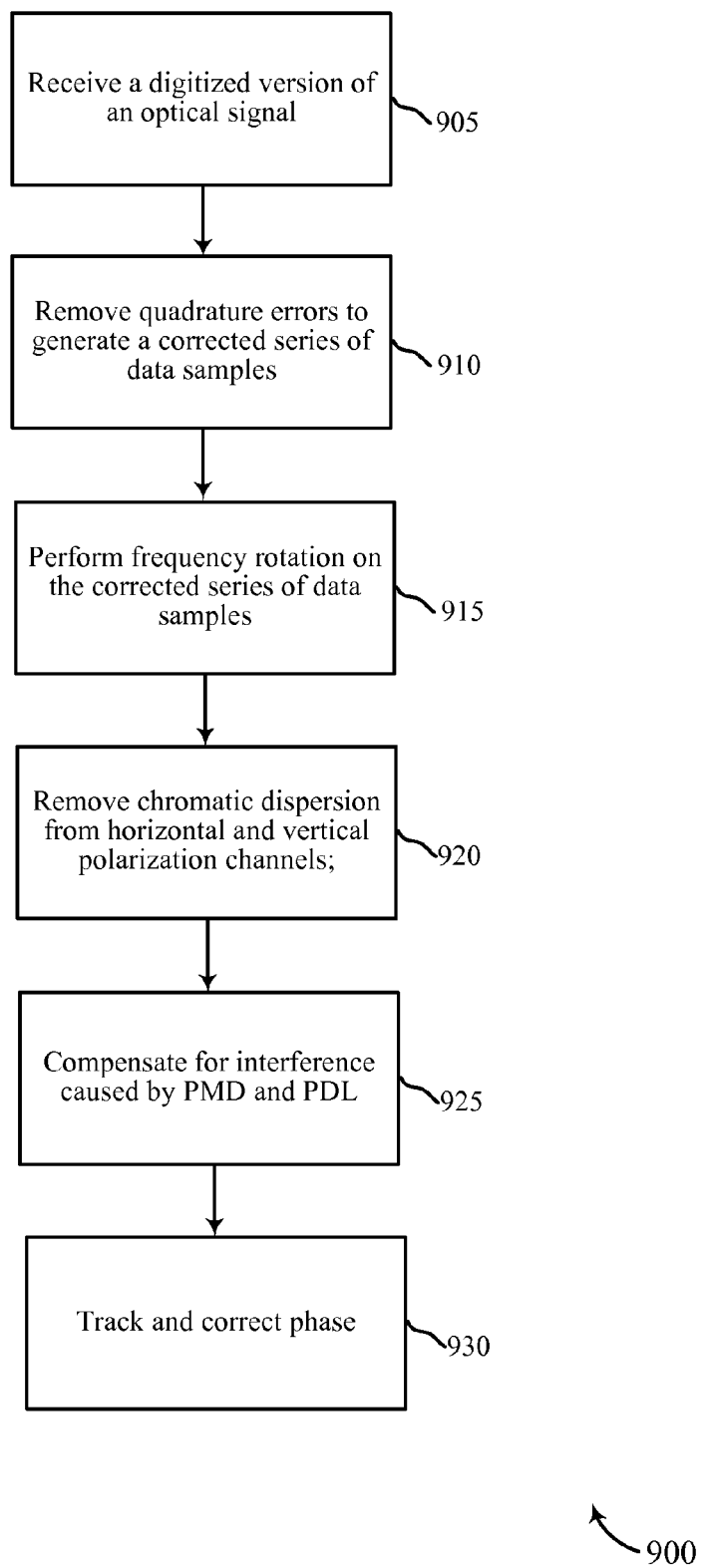
FIG. 9 is a flow chart of a method for digital demodulation of an optical signal according to various embodiments of the invention.

FIG. 9 is a flow chart of a method 900 for digital demodulation of an optical signal according to various embodiments of the invention. The method 900 may be performed by the digital demodulation and decoding unit 125 of FIG. 1 or 3. More specifically, the method 900 may be performed by the demodulator unit 310, 400, 500 of FIG. 3, 4 or 5, respectively.

At block 905, a digitized version of an optical signal is received. At block 910, quadrature errors are removed to generate a filtered series of data samples. At block 915, frequency rotation is performed on the filtered series of data samples. At block 920, chromatic dispersion is removed from the horizontal and vertical polarization channels. Compensation for interference caused by PMD and PDL occurs at block 925. At block 930, the phase is tracked and corrected.

Figure 10:
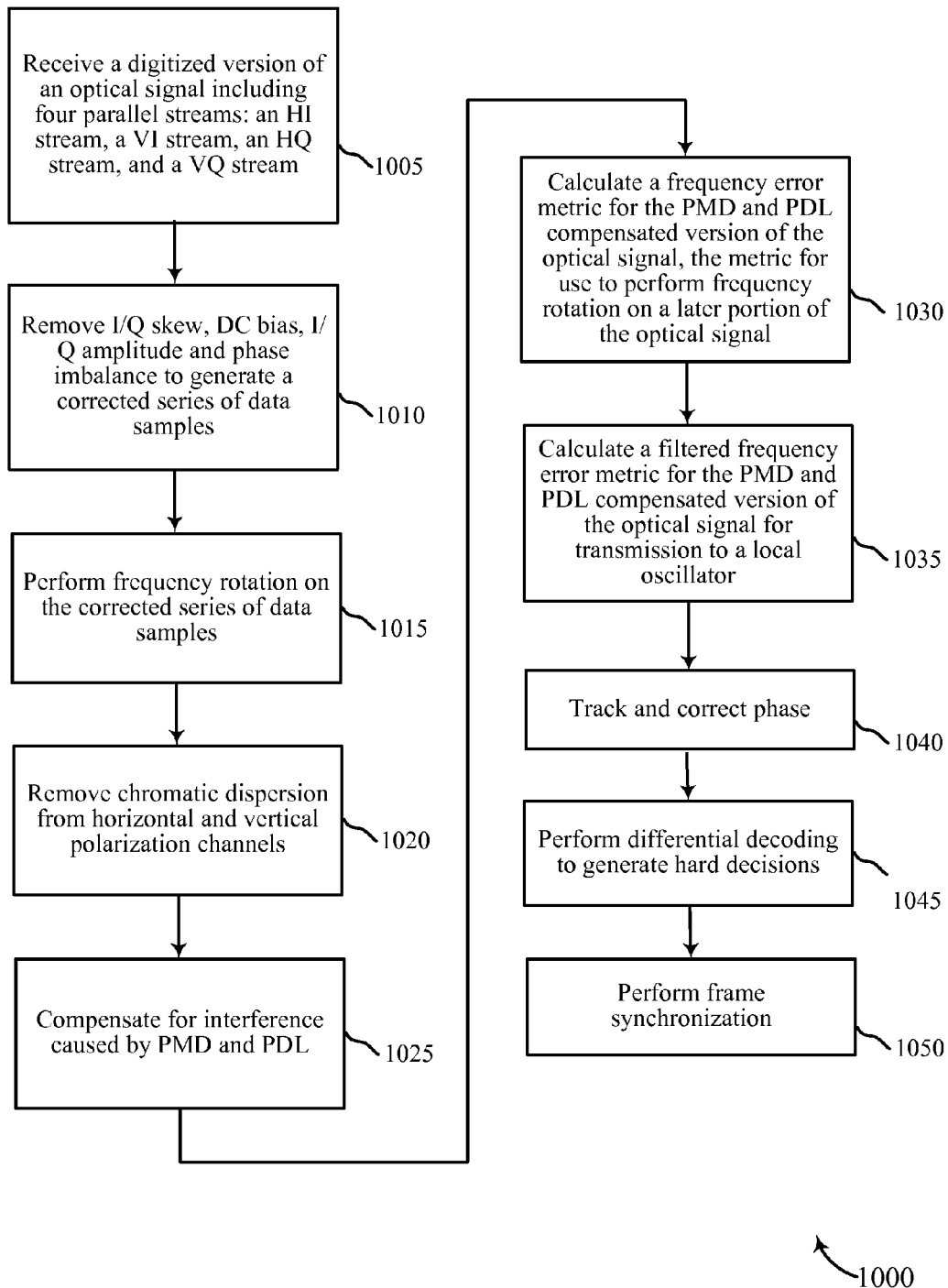
FIG. 10 is a flow chart of an alternative method for digital demodulation of an optical signal according to various embodiments of the invention.

FIG. 10 is a flow chart of an alternative method for digital demodulation of an optical signal according to various embodiments of the invention. The method 1000 may be performed by the digital demodulation and decoding unit 125 of FIG. 1 or 3. More specifically, the method 1000 may be performed by the demodulator unit 310, 400, 500 of FIG. 3, 4 or 5, respectively. The method 1000 may be an example of the method 900 of FIG. 9.

At block 1005, a digitized version of an optical signal is received, including four parallel streams: a horizontal in-phase (HI) stream, a vertical in-phase stream (VI), a horizontal quadrature (HQ) stream, and a vertical quadrature (VQ) stream. At block 1010, I/Q skew, DC bias, and I/Q amplitude and phase imbalance are removed to generate a filtered series of data samples. At block 1015, frequency rotation is performed on the filtered series of data samples is performed. At block 1020, chromatic dispersion is removed from the horizontal and vertical polarization channels. Compensation for interference caused by PMD and PDL occurs at block 1025.

At block 1030, a frequency error metric is calculated for the PMD and PDL compensated version of the optical signal, the metric to be used to perform frequency rotation on a later portion of the optical signal. At block 1035, a filtered frequency error metric is calculated for the PMD and PDL compensated version of the optical signal for transmission to a local oscillator. At block 1040, the phase is tracked and corrected. At block 1045, differential decoding is performed to generate hard decisions. At block 1050, frame synchronization is performed.

These components may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A digital demodulator device for received optical signals, the digital demodulator comprising:
   a quadrature error filter module configured to:
      receive a digitized version of an optical signal; and
      remove quadrature errors to generate a corrected series of data samples;
   a frequency offset removal module configured to perform frequency rotation on the corrected series of data samples to generate a frequency corrected series of data samples;
   a chromatic dispersion compensation module configured to remove, from the frequency corrected series of data samples, chromatic dispersion from horizontal and vertical polarization channels;
   a polarization mode dispersion (PMD)/polarization dependent loss (PDL) compensation module configured to compensate the frequency corrected series of data samples for interference caused by PMD and PDL;
   a phase recovery module configured to track and correct phase for the frequency corrected series of data samples; and
   a symbol timing acquisition and tracking module configured to perform symbol timing acquisition and tracking of the optical signal after the PMD/PDL compensation module compensates for interference caused by PMD and PDL and before carrier phase recovery of the optical signal.

2. The device of claim 1, wherein the quadrature error filter is configured to receive the digitized version of an optical signal by receiving four parallel streams comprising a horizontal in-phase stream, a vertical in-phase stream, a horizontal quadrature stream, and a vertical in-phase stream.

3. The device of claim 1, wherein the quadrature error filter is configured to remove quadrature errors by:
   detecting and removing a skew between in-phase and quadrature components.

4. The device of claim 1, wherein the quadrature error filter is configured to remove quadrature errors by:
   detecting and removing direct current bias.

5. The device of claim 1, wherein the quadrature error filter is configured to remove quadrature errors by:

detecting and removing in-phase and quadrature amplitude imbalance.

6. The device of claim 1, wherein the quadrature error filter is configured to remove quadrature errors by:
   detecting and removing in-phase and quadrature phase imbalance.

7. The device of claim 1, wherein the quadrature error filter is configured to remove quadrature errors of the optical signal before it is received by the frequency offset removal module.

8. The device of claim 1, further comprising:
   a carrier frequency acquisition and tracking module configured to calculate a frequency error metric for feedback to the frequency offset removal module.

9. The device of claim 8, wherein,
   the carrier frequency acquisition and tracking module processes the optical signal after the PMD/PDL compensation module compensates for interference caused by PMD and PDL; and
   the frequency offset removal module performs the rotation using the frequency error metric.

10. The device of claim 1, further comprising:
    a carrier frequency acquisition and tracking module configured to calculate a filtered frequency error metric for controlling a local oscillator.

11. The device of claim 1, further comprising:
    a matched filter decimator configured to implement an interpolation function that provides decimation on samples taken at substantially two+8 times the symbol rate.

12. The device of claim 1, further comprising:
    a frame synchronization module configured to skew, swap, and rotate received channels with respect to each other.

13. The device of claim 1, further comprising:
    a differential decoder configured to differentially decode a demodulated optical signal and provide the decoded output to the frame synchronization module.

14. The device of claim 1, wherein the demodulated signal comprises hard decision or soft decision data.

15. The device of claim 1, wherein the device comprises a processor.

16. A system comprising:
    means for receiving a digitized version of an optical signal;
    means for removing quadrature errors to generate a corrected series of data samples;
    means for performing frequency rotation on the corrected series of data samples to generate a frequency corrected series of data samples;
    means for removing, from the frequency corrected series of data samples, chromatic dispersion from horizontal and vertical polarization channels of a processed version of the optical signal;
    means for compensating for interference caused by polarization mode dispersion (PMD) and polarization dependent loss (PDL);
    means for tracking and correcting phase; and
    means for performing symbol timing acquisition and tracking of the optical signal after compensating for interference caused by PMD and PDL and before carrier phase recovery of the optical signal.

17. A method comprising:
    receiving a digitized version of an optical signal;
    removing quadrature errors to generate a corrected series of data samples;
    performing frequency rotation on the corrected series of data samples to generate a frequency corrected series of data samples;
    removing chromatic dispersion from horizontal and vertical polarization channels;
    compensating, after performing frequency rotation, the frequency corrected series of data samples for interference caused by polarization mode dispersion (PMD) and polarization dependent loss (PDL);
    tracking and correcting phase; and
    performing symbol timing acquisition and tracking of the optical signal after compensating for interference caused by PMD and PDL and before carrier phase recovery of the optical signal.

18. The method of claim 17, wherein the receiving the digitized version of the optical signal comprises:
    receiving four parallel streams comprising a horizontal in-phase stream, a vertical in-phase stream, a horizontal quadrature stream, and a vertical in-phase stream.

19. The method of claim 17, wherein the removing the quadrature errors comprises:
    detecting and removing a skew between in-phase and quadrature components.

20. The method of claim 17, wherein the removing the quadrature errors comprises:
    detecting and removing direct current bias.

21. The method of claim 17, wherein the removing the quadrature errors comprises:
    detecting and removing in-phase and quadrature amplitude imbalance; and
    detecting and removing in-phase and quadrature phase imbalance.

22. The method of claim 17, wherein the removing the quadrature errors for the optical signal occurs before the performing frequency rotation on the optical signal.

23. The method of claim 17, further comprising:
    calculating a frequency error metric for a PMD and PDL compensated version of the optical signal; and
    feeding back the frequency error metric for use during the performing frequency rotation.

24. The method of claim 17, further comprising:
    calculating a filtered frequency error metric for a PMD and PDL compensated version of the optical signal; and
    providing the filtered frequency error metric to a local oscillator.

25. The method of claim 17, further comprising:
    implementing an interpolation function that provides decimation on samples taken at substantially two+$\epsilon$ times the symbol rate.

26. The method of claim 17, further comprising:
    differentially decoding a demodulated optical signal and providing hard decoded output; and
    synchronizing received channels of the hard decoded output with respect to each other.

* * * * *